United States Patent
Okamoto et al.

(10) Patent No.: US 8,201,040 B2
(45) Date of Patent: Jun. 12, 2012

(54) COMMUNICATION DEVICE, RADIO COMMUNICATION TERMINAL, RADIO BASE STATION AND COMMUNICATION METHOD

(75) Inventors: Etsuhiro Okamoto, Osaka (JP);
Yukihiko Okumura, Yokohama (JP);
Tetsuro Kitayama, Tokyo (JP);
Hidetoshi Ebara, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1196 days.

(21) Appl. No.: 11/969,492

(22) Filed: Jan. 4, 2008

(65) Prior Publication Data

US 2008/0168322 A1 Jul. 10, 2008

(30) Foreign Application Priority Data

Jan. 4, 2007 (JP) ................................ P2007-000245

(51) Int. Cl.
*H04L 1/18* (2006.01)
*H03M 13/00* (2006.01)
(52) U.S. Cl. .................... 714/748; 714/749; 714/751
(58) Field of Classification Search ........... 714/747–751
See application file for complete search history.

(56) References Cited

U.S. PATENT DOCUMENTS

| 5,386,412 | A | | 1/1995 | Park et al. |
| 7,114,002 | B1 | * | 9/2006 | Okumura et al. ............. 709/232 |

FOREIGN PATENT DOCUMENTS

| CN | 1339229 A | 3/2002 |
| EP | 1 182 797 A1 | 2/2002 |
| JP | 11-262054 | 9/1999 |
| JP | 2000-513552 | 10/2000 |
| JP | 2002-535871 | 10/2002 |
| JP | 2003-318818 | 11/2003 |
| JP | 2004-507927 | 3/2004 |
| JP | 2004-112097 | 4/2004 |
| JP | 2005-045469 | 2/2005 |
| JP | 2006-523072 | 10/2006 |
| JP | 2006-333346 | 12/2006 |
| WO | WO 00/19634 | 4/2000 |
| WO | WO 02/17511 A2 | 2/2002 |
| WO | WO 02/17548 A1 | 2/2002 |
| WO | WO 02/30067 A1 | 4/2002 |
| WO | WO 02/080403 A1 | 10/2002 |

* cited by examiner

*Primary Examiner* — Cynthia Britt
*Assistant Examiner* — Daniel McMahon
(74) *Attorney, Agent, or Firm* — Oblon, Spivak, McClelland, Maier & Neustadt, L.L.P.

(57) ABSTRACT

A communication method for continuously receiving multiple pieces of data from a radio base station via a radio link. The method includes determining whether or not any one of the multiple pieces of data is lost; and making an instruction to the radio base station to increase the transmission power of the radio base station when it is determined that any one of the multiple pieces of data is lost, the instruction being made before a retransmission timing when the transmitter retransmits the lost data piece.

7 Claims, 9 Drawing Sheets

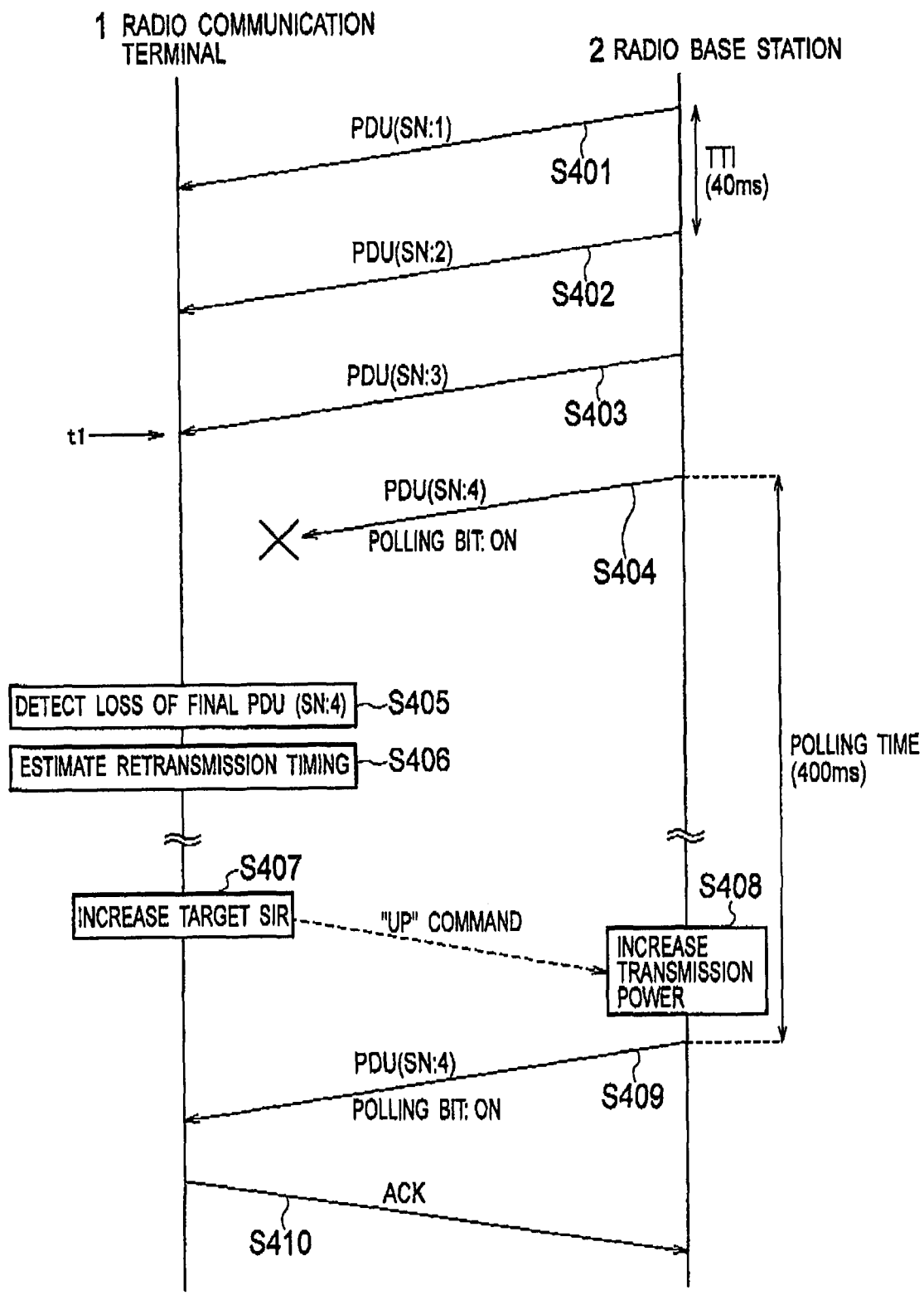

COMMUNICATION DEVICE, RADIO COMMUNICATION TERMINAL, RADIO BASE STATION AND COMMUNICATION METHOD

CROSS REFERENCE TO RELATED APPLICATION

This application is based upon and claims the benefit of priority from prior Japanese Patent Application P2007-000245 filed on Jan. 4, 2007; the entire contents of which are incorporated by reference herein.

BACKGROUND OF THE INVENTION

1. Field of the Invention

The present invention relates to a communication device and a communication method for continuously receiving multiple data (data packets) from a transmitter via a radio link, and relates to a radio communication terminal and a radio base station each including the communication device.

2. Description of the Related Art

Heretofore, in radio communications, a transmission power control technique has been used to control the transmission powers of a radio communication terminal and a radio base station. Precisely, in a downlink, a phenomenon called fading occurs in which the received power of a radio communication terminal suddenly fluctuates due to a movement of the radio communication terminal or reflection of radio waves by buildings or the like. Since such fading must be avoided, the transmission power in the downlink cannot be decreased without limitation. On the other hand, when the transmission power from a radio base station is too high, a transmission signal of a certain radio communication terminal interferes with a transmission signal of another radio communication terminal.

Accordingly, the communication quality in downlink must be maintained by controlling the transmission power of the radio base station in consideration of a fading influence, while avoiding fading and the like. For this purpose, conventional radio communication terminals employ a method of setting the reference quality for a service during communications, and of controlling the transmission power of a radio base station at a high rate so that communication quality in the downlink can follow the reference quality.

To be more precise, closed loop transmission power control composed of outer loop control and inner loop control is used. In the outer loop control, a target SIR (signal-to-interference power ratio) is controlled such that the communication quality such as the block error rate (BLER) or the bit error rate (BER) can become a target value (reference quality).

On the other hand, the inner loop control is made such that the SIR of a communication channel received by the radio communication terminal can be the target SIR. The radio communication terminal transmits a transmit power control (TPC) command to the radio base station according to a comparison result between the SIR of the communication channel and the target SIR. Here, the TPC command is information for controlling the transmission power.

In addition to the aforementioned transmission power control, retransmission control is used as a technique for securing the communication quality of radio communications performed between a radio base station and a radio communication terminal.

In the radio communications, data pieces are intermittently transmitted as divided data packets. For this reason, in the downlink retransmission control, the radio base station adds sequence numbers to data pieces. Then, by use of the sequence numbers, the radio communication terminal makes a notification as an acknowledgement (ACK) to the radio base station, the notification indicating that the data pieces have been successfully received. The radio base station retransmits a data piece that the radio communication terminal has failed to receive. As a result, highly reliable radio communications are established.

As a method for performing more highly reliable radio communications, another method has been proposed by combining the transmission power control and the retransmission control. In this method, in order to reduce a probability that a radio communication terminal will fail to receive an unacknowledge mode message (for example, a RRC CONNECTION RELEASE message indicating a completion of communications, or the like), the foregoing target SIR is increased at a predetermined timing before the radio communication terminal receives the unacknowledge mode message (see Japanese Patent Application Laid-open Publication No. 2004-112097).

By increasing the target SIR, the transmission power of the radio base station can be increased. Accordingly, the BLER is kept low for a certain period after the increase of the target SIR, and thereby the radio communication terminal more surely receives the unacknowledge mode message. In addition, in JPA 2004-112097, the transmission power of the radio base station is not increased for acknowledge mode data transmission, since a data piece is retransmitted through the aforementioned retransmission control.

However, in the following cases (1) and (2), the foregoing transmission power control does not function properly. As a result, even when the radio base station retransmits a data packet (hereinafter, called a PDU as needed), the retransmitted PDU is sometimes lost in a radio communication section, and this does not allow a receiver to receive the retransmitted PDU.

(1) A case where the SIR measurement needed for the outer loop transmission power control cannot be performed sufficiently due to a condition that data transmission is for AMR data of a silent period, is for PKTs not containing any data, or is of a bearer (SDCCH, an AMR and the like) using blind detection.

(2) A case where the reception quality is low due to an instantaneous change in a communication environment.

In these cases, since the radio base station performs retransmission repeatedly until the radio communication terminal transmits an acknowledgement (ACK) to the radio base station. As a result, the PDU is retransmitted so excessively that a problem arises that the buffer capacity and radio resources are wastefully consumed.

Moreover, when the radio communication terminal cannot receive a PDU even by use of the retransmission control, the following program occurs. In other words, as shown in FIG. 1, when the radio communication terminal cannot receive a PDU containing a transport channel reconfiguration transmitted from the radio base station, the radio base station and the radio communication terminal cannot switch to another channel at an activation time. As a result, the radio base station and the radio communication terminal get out of synchronization, and thereby are disabled to continue communicating with each other. Note that the activation time means a channel switch timing predetermined between the radio base station and the radio communication terminal before a channel switching is actually performed.

SUMMARY OF THE INVENTION

In consideration of the forgoing problems, the present invention aims to provide a communication device and a communication method that are capable of largely increasing the probability that data retransmitted by a transmitter will be successfully received, and to provide a radio communication terminal and a radio base station each including the communication device.

In summary, a first aspect of the present invention is a communication device that continuously receives a plurality of data pieces from a transmitter via a radio link. The communication device includes a determining unit (a PDU loss detector 161) and an instruction transmitter (a transmission power increase instructor 163). The determining unit is configured to determine whether or not any one of the data pieces is lost. The instruction transmitter is configured to transmit, to the transmitter, an instruction to improve transmission quality of the transmitter in a case where the determining unit determines that any one of the data pieces is lost. The instruction transmitter transmits the instruction before retransmission timing when the transmitter retransmits the lost data piece. Here, the "transmission quality" means, for example, the transmission power.

According to this aspect, the transmitter is instructed to improve the transmission quality of the transmitter before the retransmission timing. Accordingly, a probability of successfully receiving a data piece retransmitted by the transmitter can be enhanced to a large extent.

In summary, a second aspect of the present invention is the communication device according to the first aspect of the present invention, further including a requesting unit (a STATUS PDU transmitter 162) configured to request the transmitter, when the determining unit determines that any one of the data pieces is lost, to retransmit the lost data piece. In addition, the instruction transmitter transmits the instruction at the same time of the retransmission request or after the retransmission request.

In summary, a third aspect of the present invention is the communication device according to the first aspect of the present invention in which the determining unit determines whether any one of the data pieces is lost, according to whether sequence numbers respectively included in the data pieces are continuous.

In summary, a fourth aspect of the present invention is the communication device according to the first aspect of the present invention in which the determining unit determines whether the final data piece of the data pieces is lost, in a case where any one of the data pieces is not received for a fixed time period before the final data piece is received.

In summary, in a fifth aspect of the present invention, the transmitter retransmits the final data piece to the communication device according to the fourth aspect of the present invention when an acknowledgement corresponding to the final data piece is not received from the communication device for a predetermined time period; and when the determining unit determines that the final data piece is lost, the instruction transmitter estimates the retransmission timing on the basis of a receiving time of the last data piece before the final data piece, the predetermined time period, and a time interval at which the transmitter transmits the data pieces.

In summary, a sixth aspect of the present invention is a radio communication terminal comprising the communication device according to any one of the first to fifth aspects of the present invention.

In summary, a seventh aspect of the present invention is a radio base station comprising the communication device according to any one of the first to fifth aspects of the present invention.

In summary, an eight aspect of the present invention is a communication method for continuously receiving a plurality of data pieces from a transmitter via a radio link. The communication method includes the steps of: determining whether or not any one of the plurality of data pieces is lost; and transmitting, to the transmitter, an instruction to improve transmission quality of the transmitter when it is determined that any one of the data pieces is lost the instruction being made before a retransmission timing when the transmitter retransmits the lost data piece.

The present invention makes it possible to provide a communication device and a communication method capable of largely enhancing a probability of successfully receiving data retransmitted by a transmitter, and also to provide a radio communication terminal and a radio base station each including the communication device.

BRIEF DESCRIPTION OF THE DRAWINGS

FIG. 10 is a sequence diagram showing an operation sequence of a mobile communication system according to the second embodiment of the present invention.

DETAILED DESCRIPTION OF THE INVENTION

Figure 1:
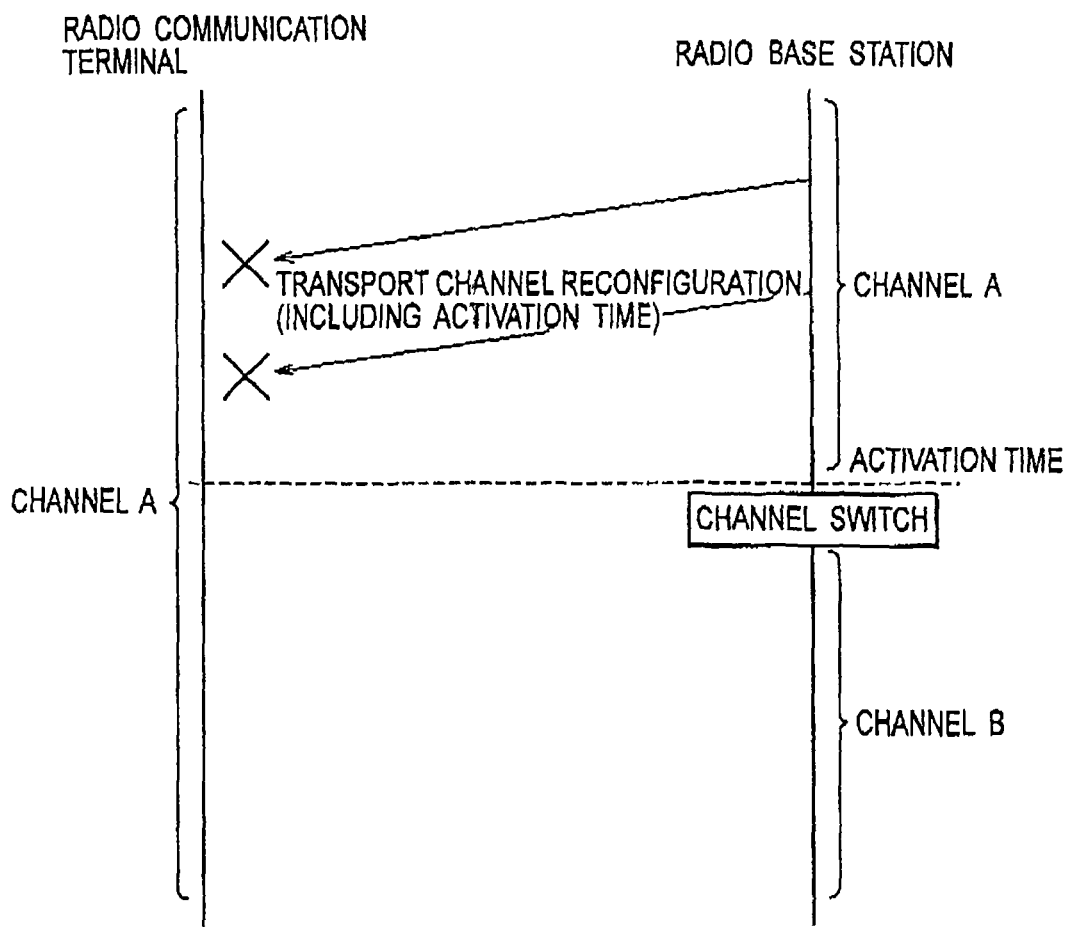
FIG. 1 is a diagram for explaining a problem to be solved by the present invention.

Hereinafter, embodiments of the present invention will be described with reference to the accompanying drawings. In the following description of the drawings, the same or similar reference numerals are given to the same or similar elements.
[First Embodiment]
(Schematic Configuration of Mobile Communication System)

Figure 2:
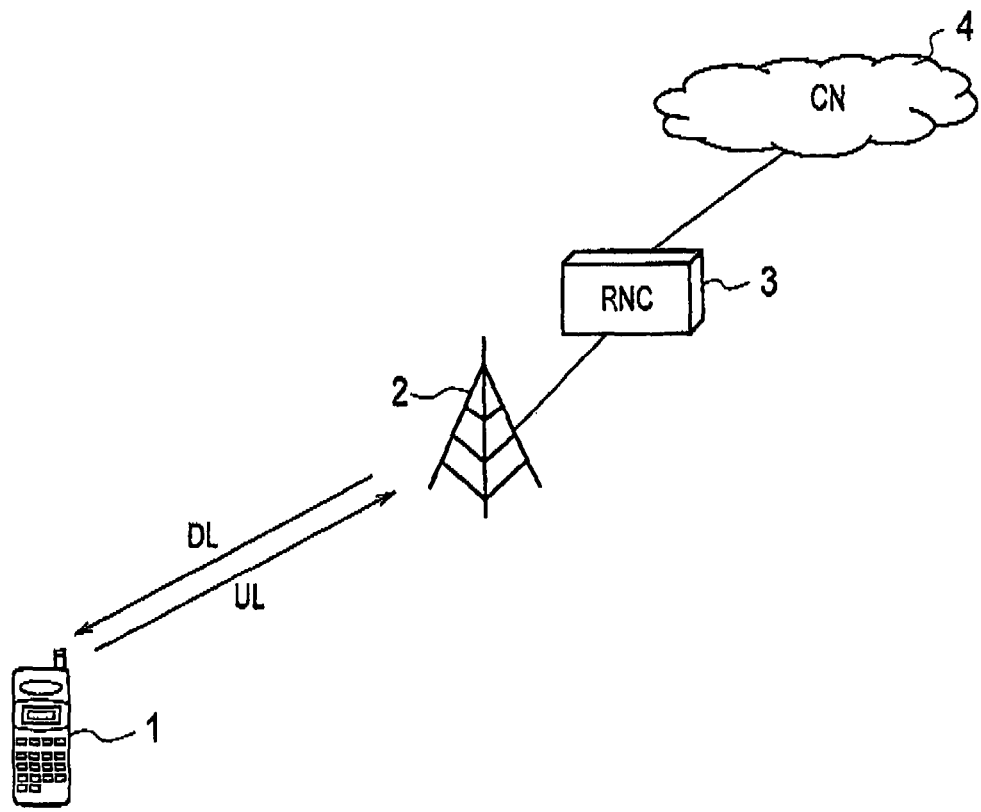
FIG. 2 is a schematic configuration diagram of an entire mobile communication system according to a first embodiment of the present invention.

FIG. 2 is an entire schematic configuration of a mobile communication system according to this embodiment. This mobile communication system is one using the W-CDMA scheme.

As shown in FIG. 2, the mobile communication system includes a radio communication terminal 1, a radio base station 2, a radio network controller (called a "RNC" below) 3 and a core network (called a "CN" below) 4.

The radio communication terminal 1 establishes a radio link with the radio base station 2 when existing in the radio area of the radio base station 2, and communicates with another communication device via the CN 4. The radio communication terminal 1 controls the transmission power of the radio base station 2 in a downlink DL by use of the closed loop transmission power control.

The radio base station 2 has radio resources controlled by the RNC 3 and performs radio communications with the radio communication terminal 1. The radio base station 2 controls the transmission power of the radio communication terminal 1 in an uplink UL by use of the closed loop transmission power control.

The RNC 3 functions as a higher-level apparatus of the radio base station 2, and controls the radio resources used by the radio base station 2. The RNC 3 has a function of executing the transmission power control (outer loop transmission power control). Incidentally, in some cases, the function of the RNC 3 is incorporated in the radio base station 2, and the radio base station 2 executes the function of the RNC 3.

The CN 4 is a network for performing position control, call control and service control and is configured of an ATM switching network, a packet switching network, a router network and the like.

(Configuration of Radio Communication Terminal)

Hereinafter, a configuration of the radio communication terminal 1 according to this embodiment will be described by referring to FIGS. 3 to 5. The description relating to the present invention is mainly provided below.

Figure 3:
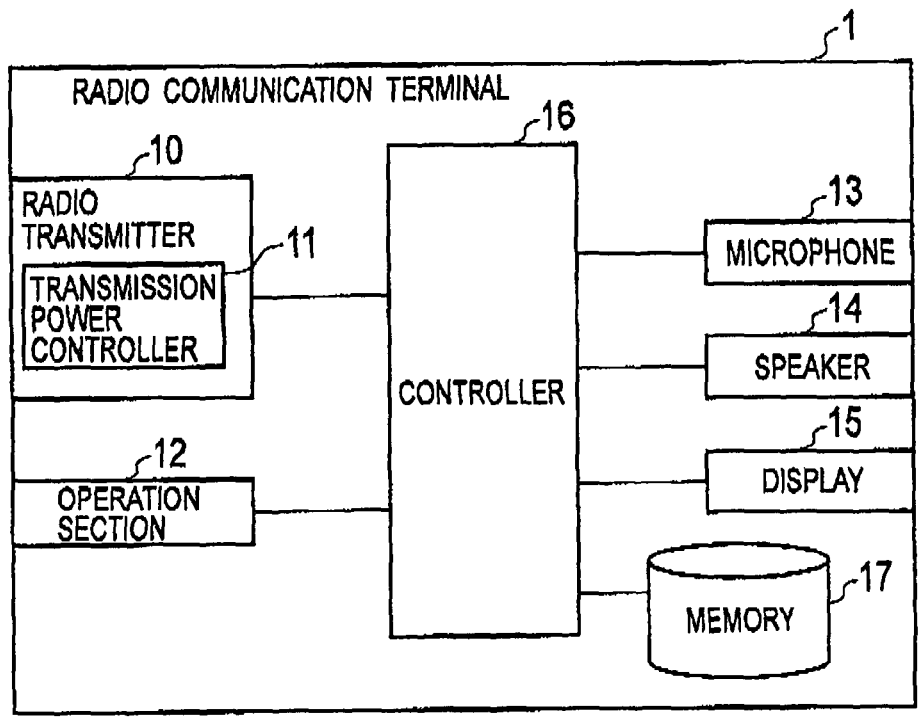
FIG. 3 is a functional block diagram showing a schematic configuration of a radio communication terminal according to the first embodiment of the present invention.

(1) Schematic Configuration of Radio Communication Terminal:

FIG. 3 is a functional block diagram showing a schematic configuration of the radio communication terminal 1. As shown in FIG. 3, the radio communication terminal 1 includes a radio transmitter 10, an operation section 12, a microphone 13, a speaker 14, a display 15, a controller 16 and a memory 17.

The radio transmitter 10 transmits and receives radio signals in accordance with the CDMA scheme to and from the radio base station 2. The radio transmitter 10 performs processing of converting the radio signals into baseband signals, and performs input/output of the baseband signals from/to the controller 16. The radio transmitter 10 includes a transmission power controller 11 configured to perform the transmission power control in the downlink DL.

The operation section 12 is configured of ten keys, function keys, and the like, and receives user operations.

The microphone 13 collects voice, and inputs audio signals based on the collected voice to the controller 16.

The speaker 14 outputs sound based on the audio signal obtained from the controller 16.

The display 15 displays image data received via the radio transmitter 10 and the controller 16, and information on user operations.

The controller 16 controls various functions provided to the radio communication terminal 1. The memory 17 stores therein various kinds of information used for control in the radio communication terminal 1, and the like. The description for more detailed functional blocks of the controller 16 and the memory 17 will be provided below.

Figure 4:
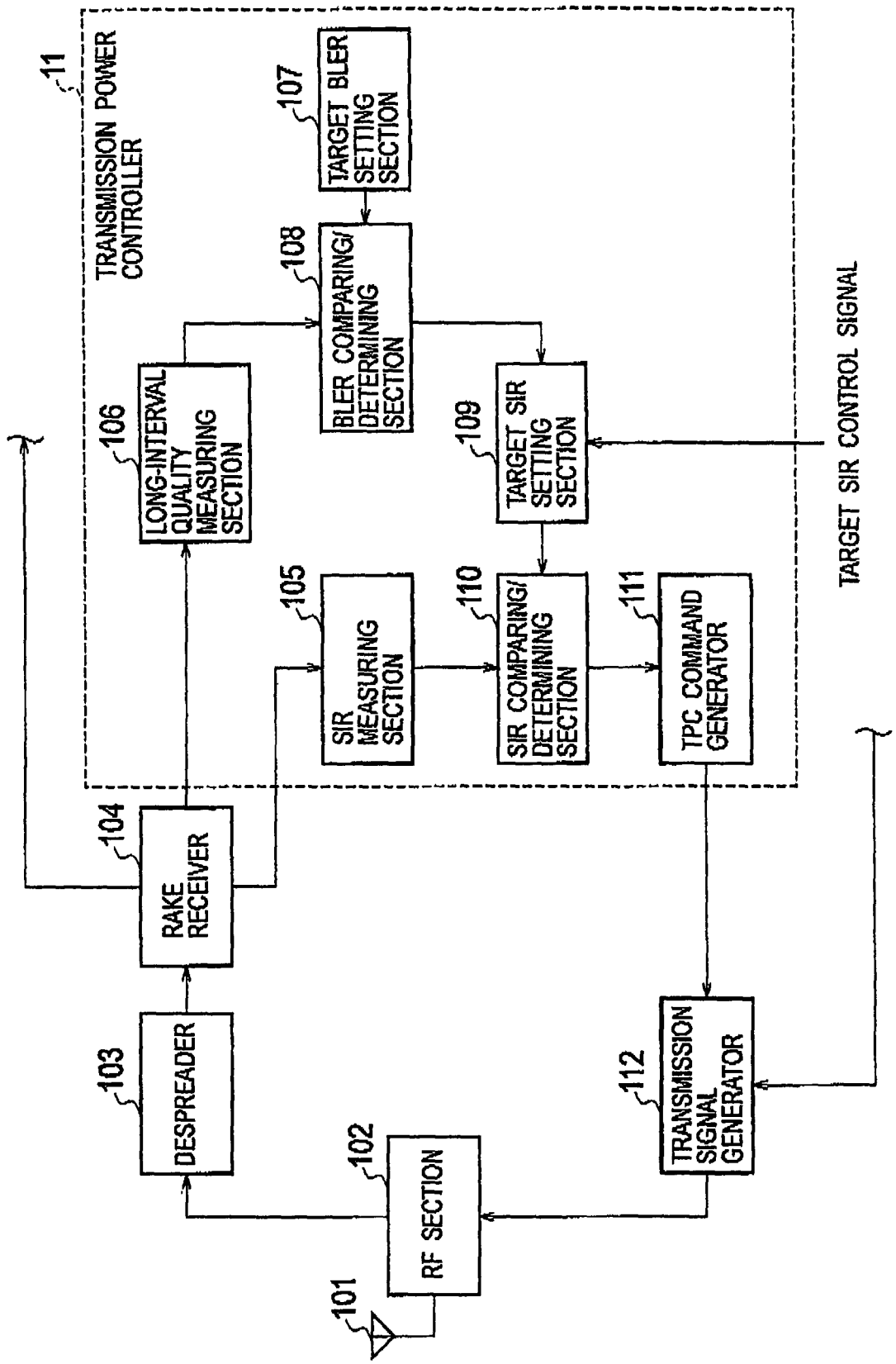
FIG. 4 is a functional block diagram showing a detailed configuration of the radio transmitter according to the first embodiment of the present invention.

(2) Detailed Configuration of Radio Transmitter:

FIG. 4 is a functional block diagram showing a detailed configuration of the radio transmitter 10 shown in FIG. 3. As shown in FIG. 4, the radio transmitter 10 includes an antenna 101, an RF section 102, a despreader 103, a RAKE receiver 104 and a transmission signal generator 112 in addition to the transmission power controller 11.

The transmission power controller 11 includes an SIR measuring section 105, a long-interval quality measuring section 106, a target BLER setting section 107, a BLER comparing/determining section 108, a target SIR setting section 109, an SIR comparing/determining section 110 and a TPC command generator 111.

In the transmission power controller 11, the long-interval quality measuring section 106, the target BLER setting section 107, the BLER comparing/determining section 108 and the target SIR setting section 109 are involved in the execution of the outer loop transmission power control. In the transmission power controller 11, the SIR measuring section 105, the SIR comparing/determining section 110 and the TPC command generator 111 are involved in the execution of the inner loop transmission power control.

A received signal received by the antenna 101 is inputted to the RF section 102, and then is downconverted. The despreader 103 performs dispreading processing on the downconverted received signal by using scrambling codes and channelization codes assigned by the radio base station 2.

The RAKE receiver 104 performs RAKE combining, error correction and decoding of the received signal after the dispreading process. A data sequence outputted by the RAKE receiver 104 is inputted to the SIR measuring section 105 and the long-interval quality measuring section 106.

The SIR measuring section 105 measures the SIR of a communication channel according to the signal power value and the interference power value inputted from the RAKE receiver 104.

The long-interval quality measuring section 106 measures the BLER in the data sequence outputted from the RAKE receiver 104. The BLER is measured from the data sequence at long intervals such as several hundred milliseconds to several seconds, by using the number of transport blocks determined as correct as a result of the CRC. The long-interval quality measuring section 106 notifies the BLER comparing/determining section 108 of the BLER obtained through this measurement.

The BLER comparing/determining section 108 figures out an offset value for the target SIR as a value proportional to a difference between the measured BLER and the target BLER value set by the target BLER setting section 107.

The target SIR setting section 109 notifies the SIR comparing/determining section 110 of the target SIR value. The target SIR setting section 109 has a function of changing the target SIR according to a target SIR control signal transmitted from the controller 16.

Thereby, the target SIR is increased when the measured BLER value is greater than the target BLER value, that is, when the reception quality is low, while the target SIR is decreased when the measured BLER value is smaller than the target BLER value, that is, when the reception quality is high.

The SIR comparing/determining section 110 compares the SIR measured by the SIR measuring section 105, with the target SIR set by the target SIR setting section, and determines whether or not the measured SIR value is greater than the target SIR value. The SIR comparing/determining section 110 notifies the TPC command generator 111 of the determination result.

According to the determination result of the SIR comparing/determining section 110, the TPC command generator 111 issues a TPC command ("UP" command) for increasing the transmission power when the measured SIR does not reach the target SIR, and issues a TPC command ("DOWN" command) for decreasing the transmission power when the measured SIR is the target SIR value or more. The TPC commands are transmitted periodically in slot cycles (0.667 ms).

The data sequence from the RAKE receiver 104 is processed through the quadrature demodulation, decoding, error correction decoding and the like, and then is inputted to the controller 18. Consequently, the controller 18 supplies the audio signal to the speaker 19 and the image signal to the display 15.

The transmission signal generator 112 multiplexes transmission data of various transmission channels. The multiplexed transmission data is supplied to the RF section 102, is upconverted after being processed through the modulation process and the spread spectrum process, and then is transmitted from the antenna 101.

Figure 5:
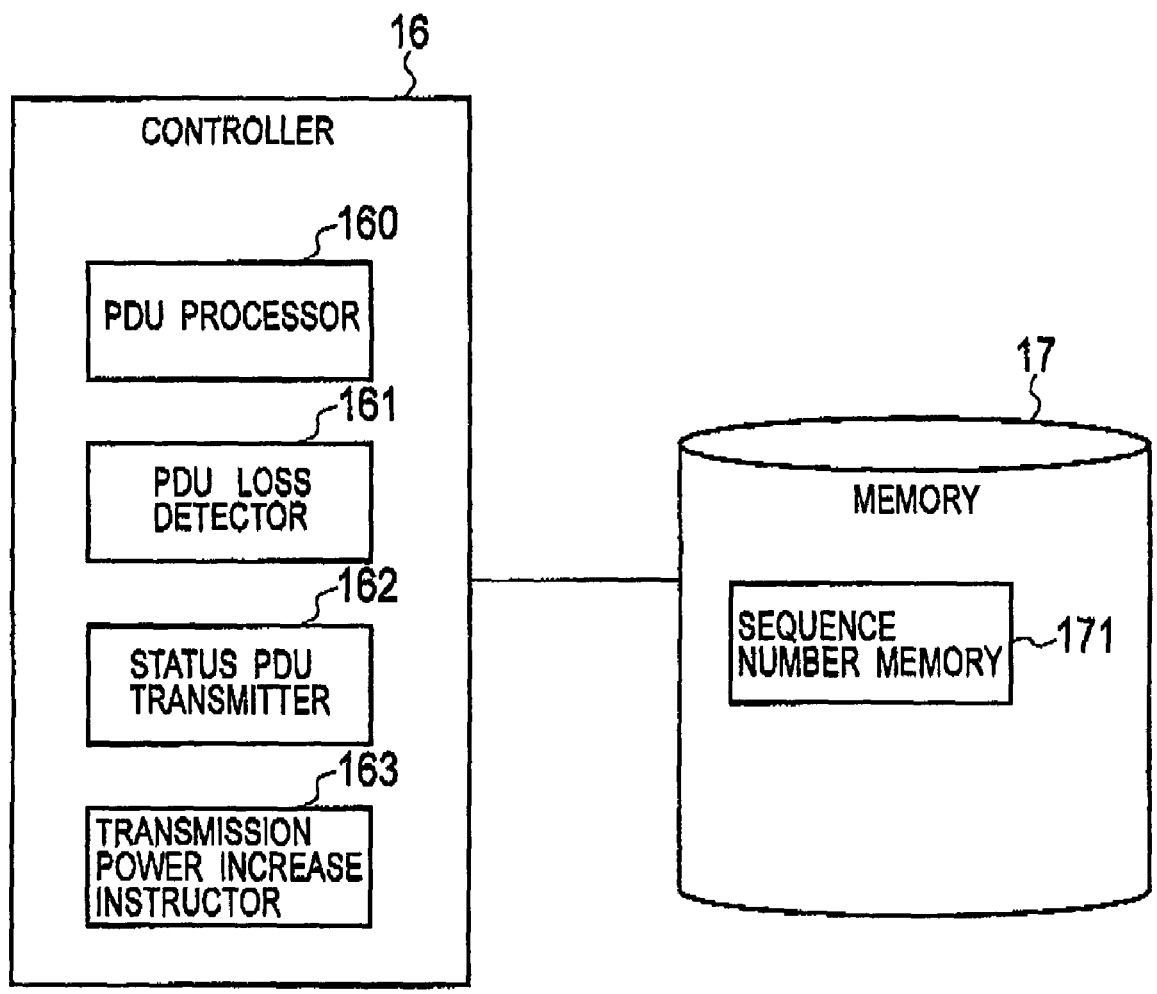
FIG. 5 is a functional block diagram showing a detailed configuration of a controller according to the first embodiment of the present invention controller.

(3) Detailed Configuration of Controller:

FIG. 5 is a functional block diagram showing a detailed configuration of the controller 16 shown in FIG. 3. As shown in FIG. 5, the controller 16 includes a PDU processor 160, a PDU loss detector 161, a STATUS PDU transmitter 162 and a transmission power increase instructor 163.

The PDU processor 160 processes PDUs received from the radio base station 2. Note that a PDU (Protocol Data Unit) is a data unit managed in a protocol (for example, RLC) for controlling data transmission in a radio link. In addition, RLC is a protocol that is located at the data link layer of the OSI reference model, is proposed by 3GPP (3rd Generation Partnership Project), and is standardized to control the radio link.

In this embodiment, the PDU processor 160 processes PDUs (AMD PDUs) used in acknowledge mode data transfer in accordance with RLC. The AMD PDU has a field for storing a sequence number and a polling bit in its header. The initial value of the sequence number is 0, and 1 is added to the sequence number PDU by PDU in the radio base station 2. The polling bit is set to "1" (ON) in the PDU (called "the final PDU" below) that is located at the final position in the transmit buffer or the retransmit buffer in the radio base station 2.

Thus, by setting the polling bit to 1 in the final PDU of a series of PDUs, the radio base station 2 requests the radio communication terminal 1 to return a STATUS PDU (called an "ACK" below) for acknowledgement.

The PDU loss detector 161 detects a PDU loss according to the continuity of the sequence numbers of PDUs. More precisely, when a PDU is missing in a radio communications section, or when a PDU is determined as NG in the CRC check even though the PDU is received, the sequence number is skipped. In this case, it is determined that the PUD is lost.

The STATUS PDU transmitter 162 starts the transmission of a STATUS PDU when a PDU loss is detected, and when the polling bit of a PDU is "1" (ON). The STATUS PDU is used to transmit control information (STATUS information) that is used in the retransmission control. In this embodiment, when a PDU loss is detected, the STATUS PDU transmitter 162 transmits a STATUS PDU (list request) requesting to retransmit the lost PDU. Incidentally, the STATUS PDU is a PDU having a higher priority than a data PDU.

At a time when or immediately after the STATUS PDU (list request) is transmitted, the transmission power increase instructor 163 transmits a target SIR control signal to the target SIR setting section 109 in FIG. 4. The target SIR control signal instructs to increase the target SIR. As a result, the TPC command generator 111 generates a TPC command ("UP" command) for increasing the transmission power of the radio base station 2.

(Operations of Mobile Communication System)

Hereinafter, operations of the mobile communication system according to this embodiment will be described by referring to FIGS. 6 and 7.

Figure 6:
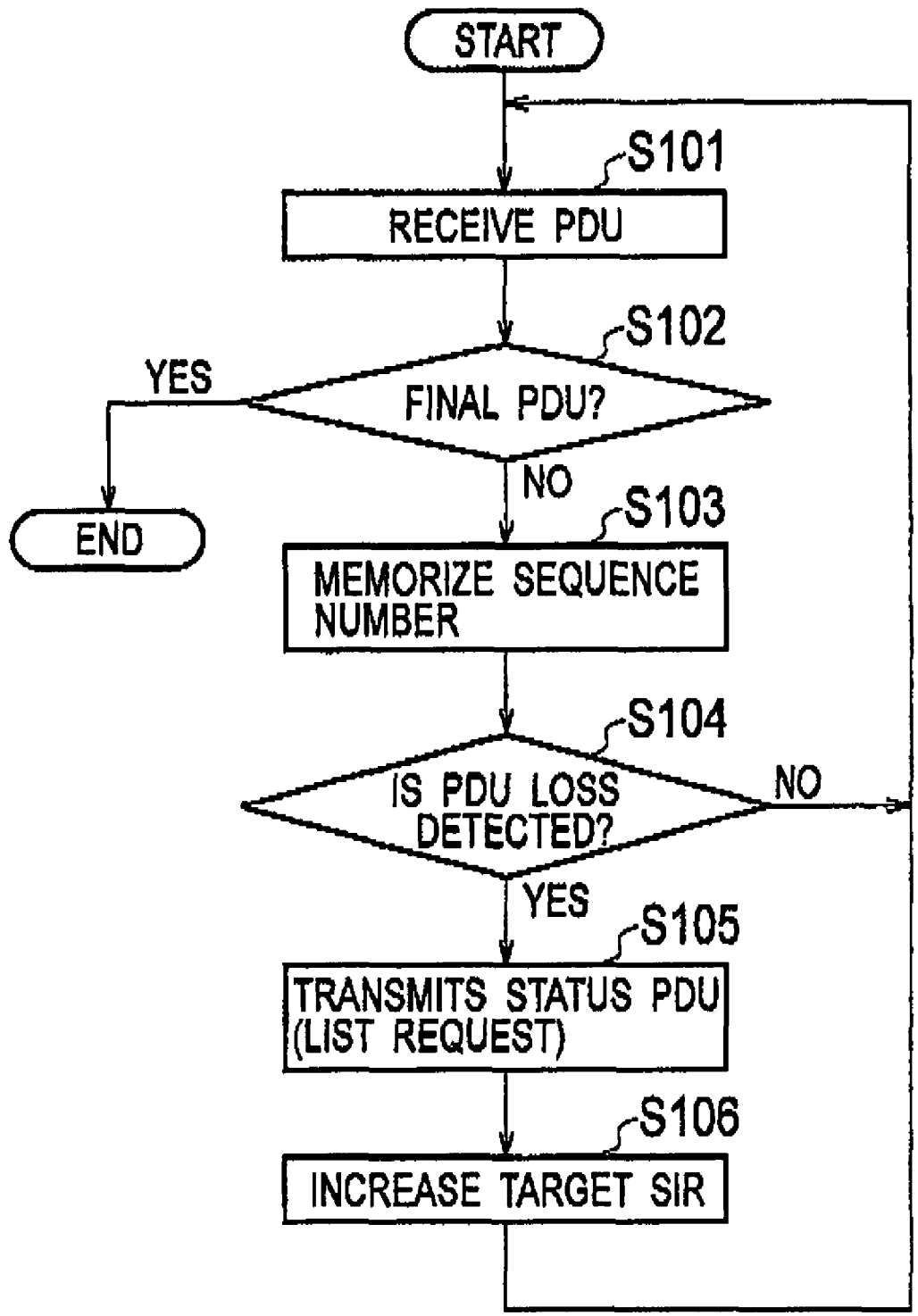
FIG. 6 is a flowchart showing a receiving operation flow of the radio communication terminal according to the first embodiment of the present invention.

(1) Receiving Operation Flow of Radio Communication Terminal:

FIG. 6 is a flowchart showing a receiving operation flow of the radio communication terminal 1 according to this embodiment.

In step S101, the radio communication terminal 1 receives a PDU from the radio base station 2.

In step S102, the radio communication terminal 1 determines whether or not the PDU received in step S101 is the final PDU. Specifically, the radio communication terminal 1 determines whether or not the polling bit stored in the header of the PDU is set to "1" (ON). When the polling bit is set to "1" (ON), the radio communication terminal 1 transmits an ACK to the radio base station 2, and terminates the receiving operation. When the polling bit is not set to "1" (ON), the operation moves to the processing in step S103.

In step S103, the radio communication terminal 1 memorizes the sequence number stored in the header of the PDU received in step S101.

In step S104, the radio communication terminal 1 determines whether or not a PDU is lost, according to whether or not the sequence number of the PDU lastly received and the sequence number of the PDU currently received are continuous. When the PDU loss is detected, the operation moves to the processing in step S105. When the PDU loss is not detected, the operation returns to the processing in step S101.

In step S105, the radio communication terminal 1 transmits, to the radio base station 2, the STATUS PDU (list request) requesting to retransmit the lost PDU.

In step S106, the radio communication terminal 1 increases the target SIR by a fixed value (for example, 1 dB), and the operation returns to the processing in step S100.

Figure 7:
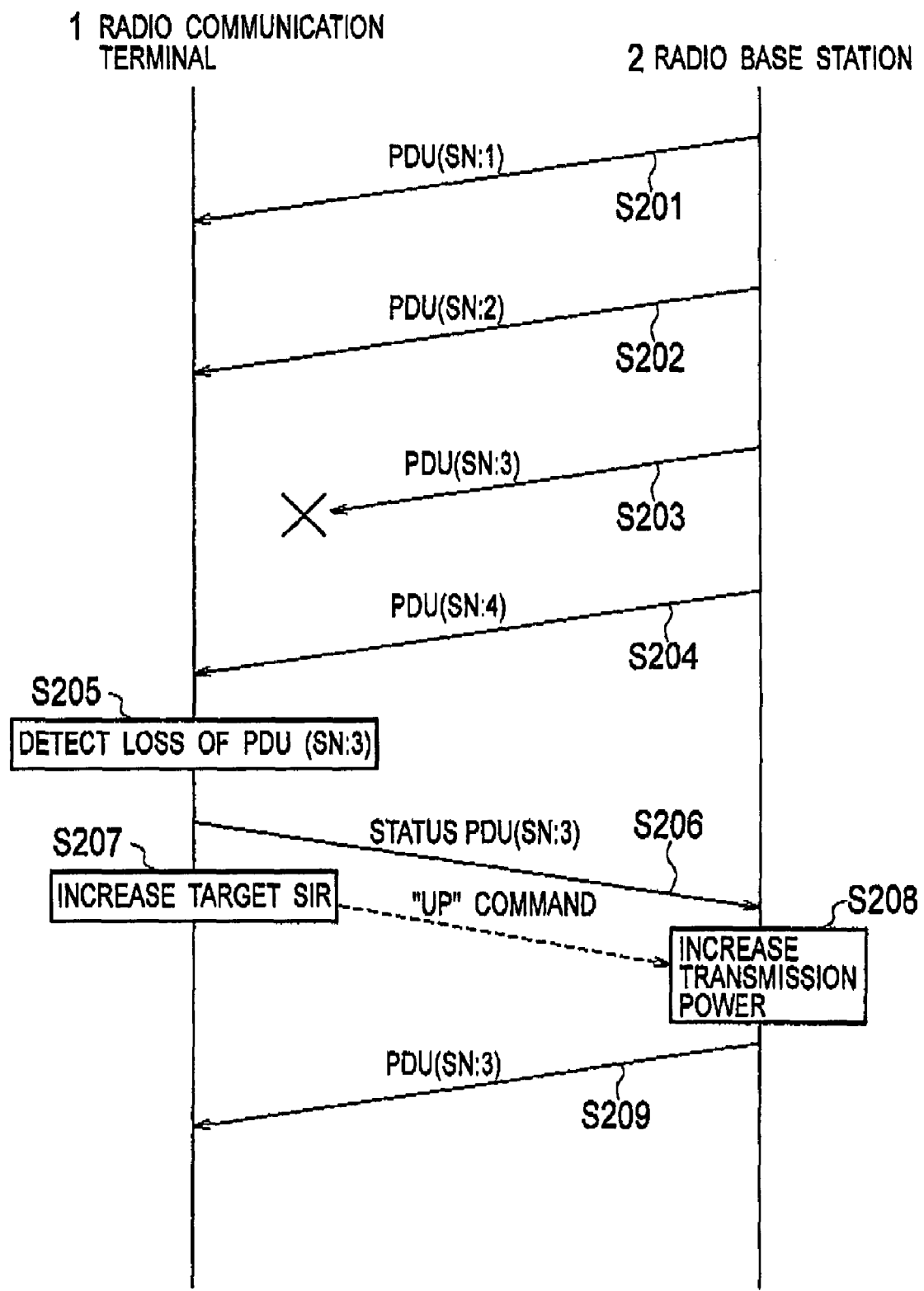
FIG. 7 is a sequence diagram showing an operation sequence of the mobile communication system according to the first embodiment of the present invention mobile communication system.

(2) Operation Sequence of Mobile Communication System:

FIG. 7 is a sequence diagram showing an operation sequence of the mobile communication system according to this embodiment.

In step S201, the radio base station 2 transmits the PDU of the sequence number "1" to the radio communication terminal 1. The radio communication terminal 1 receives the PDU transmitted by the radio base station 2, and memorizes the sequence number "1."

In step S202, the radio base station 2 transmits the PDU of the sequence number "2" to the radio communication terminal 1. The radio communication terminal 1 receives the PDU transmitted by the radio base station 2, and memorizes the sequence number "2."

In step S203, the radio base station 2 transmits the PDU of the sequence number "3" to the radio communication terminal 1. However, here, assume that the PDU of the sequence number "3" is missing in the radio communication section due to a change in the radio communication environment, and accordingly is not received by the radio communication terminal 1.

In step S204, the radio base station 2 transmits the PDU of the sequence number "4" to the radio communication terminal 1. The radio communication terminal 1 receives the PDU transmitted by the radio base station 2, and memorizes the sequence number "4."

In step S205, the radio communication terminal 1 detects the loss of the PDU of the sequence number "3" on the basis of a fact that the sequence number "2" memorized in step S202 and the sequence number "4" memorized in step S204 are not continuous.

In step S206, the radio communication terminal 1 transmits to the radio base station 2 the STATUS PDU requesting to retransmit the PDU of sequence number "3." The radio base station 2 receives the STATUS PDU transmitted by the radio communication terminal 1.

In step S207, the radio communication terminal 1 increases the target SIR by a fixed value (for example, 1 dB) immediately after the transmission of the STATUS PDU in step S206. Incidentally, the operation in step S207 may be executed at the same time as the operation in step S206. By increasing the target SIR by the fixed value, the TPC command periodically transmitted from the radio communication terminal 1 to the radio base station 2 is set to be a command instructing to increase the transmission power, that is, the "UP" command.

In step S208, in response to receipt of the "UP" command, the radio base station 2 increases, by the fixed value (for example, 1 dB), the transmission power of the communication channel with the radio communication terminal 1.

In step S209, in response to the STATUS PDU received in step S206, the radio base station 2 retransmits the PDU of the sequence number "3" having been transmitted in step S203. In step S209, since the transmission power of the communication channel with the radio communication terminal 1 is increased, the radio communication terminal 1 is able to stably receive the PDU retransmitted by the radio base station 2.

As has been described in detail, when it is determined that a PDU is lost, the radio communication terminal 1 according to this embodiment requests the radio base station 2 to retransmit the lost PDU. The radio communication terminal 1 instructs the radio base station 2 to increase the transmission power either simultaneously at the retransmission timing, or after the retransmission request and before the retransmission timing.

Accordingly, since the radio communication terminal 1 becomes enabled to stably receive the PDU retransmitted by the radio base station 2, the resources of the radio base station 2 and the radio resources are not wastefully consumed. Moreover, the radio base station 2 and the radio communication terminal 1 are prevented from getting out of synchronization.

[Second Embodiment]

In a second embodiment, the points different from the aforementioned first embodiment are mainly explained. A mobile communication system according to this embodiment is configured in the same manner as in FIG. 2. In addition, a radio communication terminal 1 according to this embodiment has the same configuration as in FIGS. 3 and 4 except for a controller 16.

(Configuration of Controller)

Figure 8:
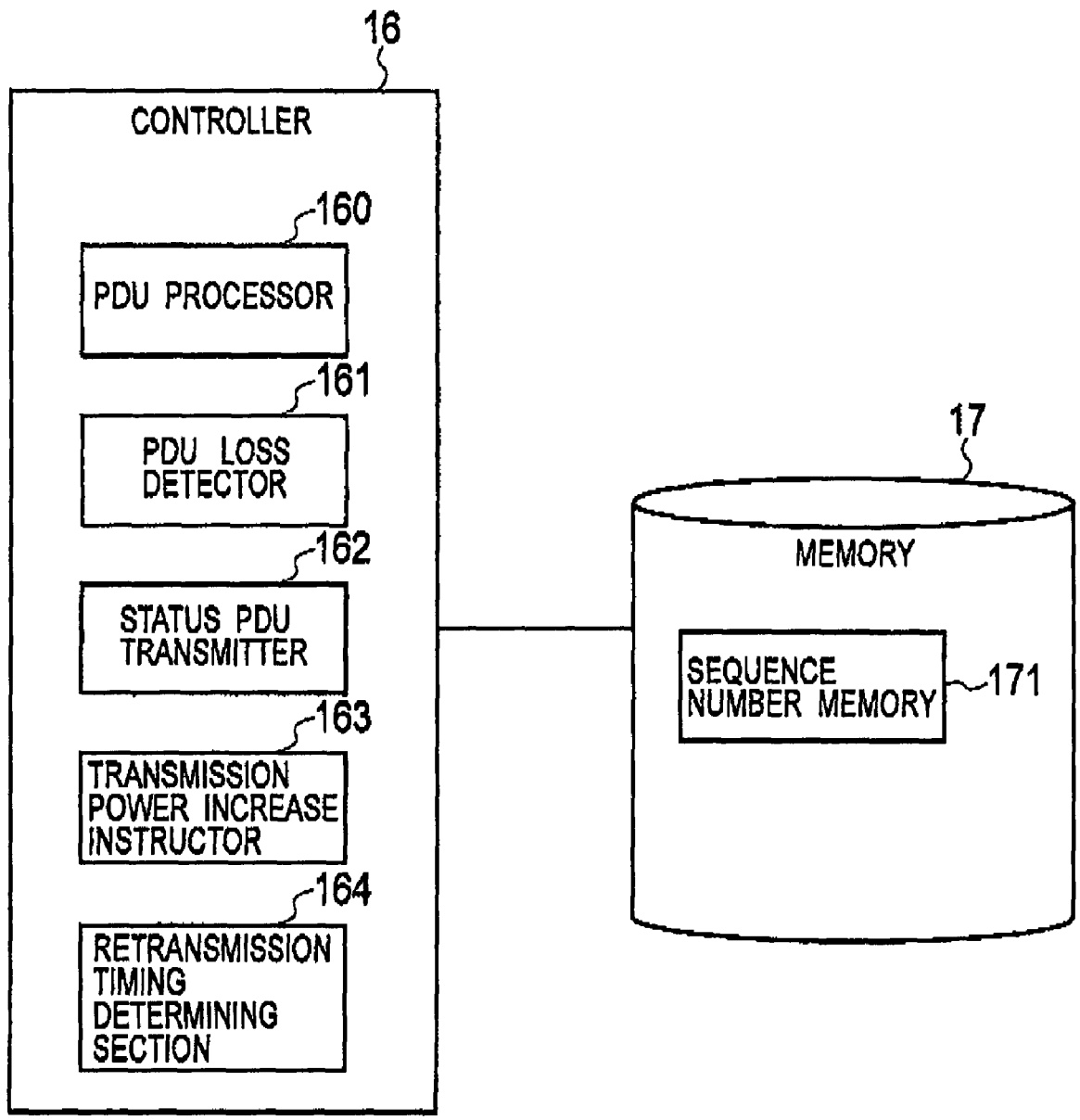
FIG. 8 is a functional block diagram showing a configuration of a controller according to a second embodiment of the present invention.

FIG. 8 is a functional block diagram showing a configuration of the controller 16 of the radio communication terminal 1 according to this embodiment.

As shown in FIG. 8, the controller 16 of this embodiment is different from that of the aforementioned first embodiment in that the controller 16 includes a retransmission timing determining section 164 configured to determine (estimate) a retransmission timing in the radio base station 2.

When a PDU loss detector 161 detects a PDU loss, the retransmission timing determining section 164 determines (estimates) the PDU retransmission timing by the radio base station 2 by use of the following equation, and determines a time (target SIR update time) for increasing the target SIR, according to the determined retransmission timing.

$$\text{Target SIR Update Time} = \text{Last PDU Receiving Time} + \text{Polling Time} + \text{TTI} - \Delta t \quad (1)$$

In the equation (1), TTI (transmission time interval) denotes a time interval between PDU transmissions. Incidentally, the TTI for DCCH massages is on the order of 40 ms.

In the equation (1), the polling time denotes the maximum time after the transmission of the final PDU until the receipt of the ACK. In other words, when the ACK is not received from the radio communication terminal 1 within the polling time, the final PDU is retransmitted to the radio communication terminal 1. The radio communication terminal 1 is notified of the polling time by the network side (the radio base station 2).

In the equation (1), $\Delta t$ denotes a predetermined certain time.

Moreover, the PDU loss detector 161 according to this embodiment detects a PDU loss not according to the sequence numbers of PDUs but according to whether or not a period when no PDU is received exceeds a fixed threshold. Specifically, the PDU loss detector 161 determines that a PDU is lost when any PDU is not received within a double TTI period (2 TTIs).

(Operations of Mobile Communication System)

Next, operations of the mobile communication system according to this embodiment will be described by referring to FIGS. 9 and 10.

Figure 9:
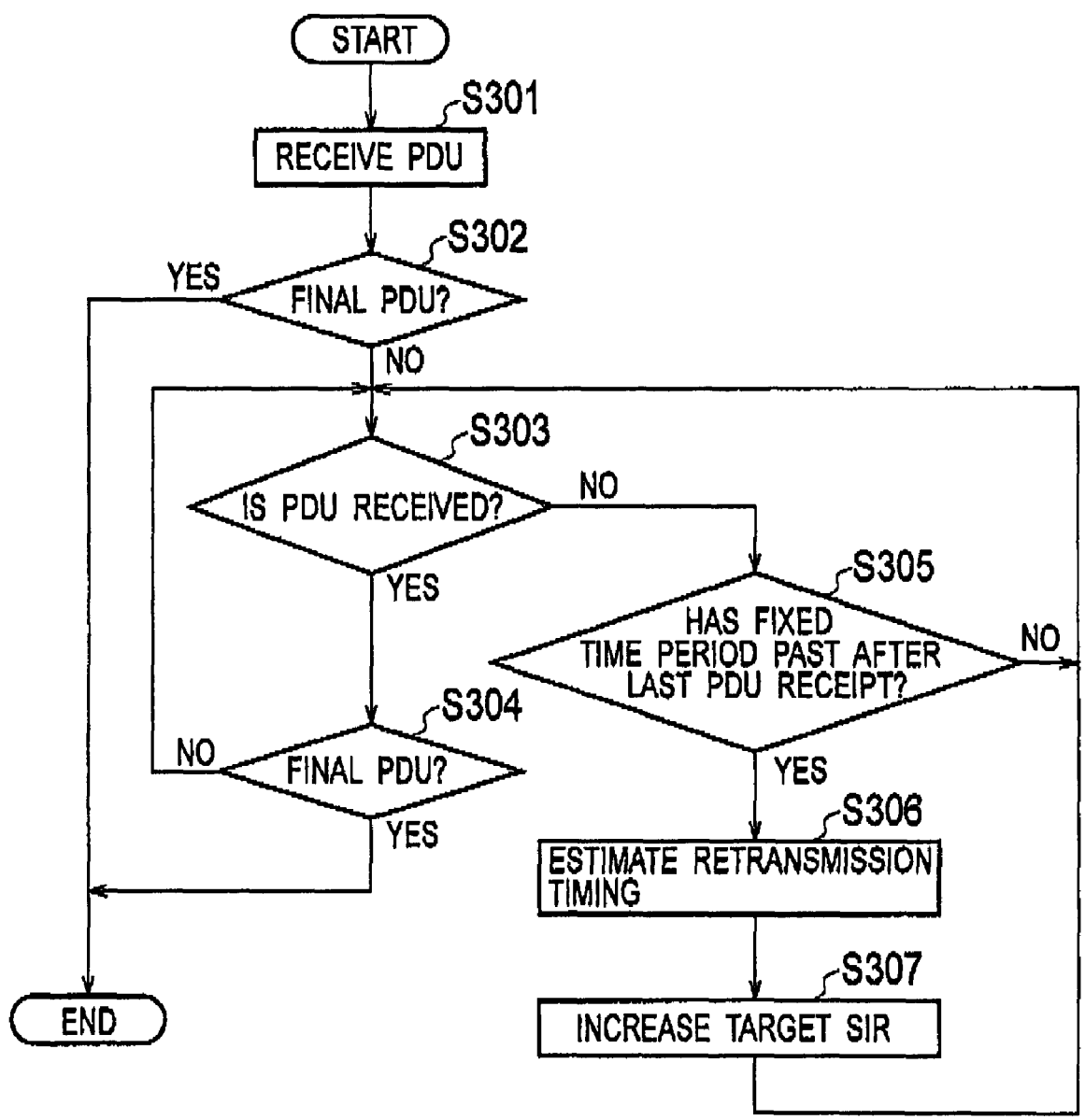
FIG. 9 is a flowchart showing a receiving operation flow in a radio communication terminal according to the second embodiment of the present invention.

(1) Receiving Operation Flow of Radio Communication Terminal:

FIG. 9 is a flowchart showing a receiving operation flow of the radio communication terminal 1 according to this embodiment. Here, the redundant description for the same processing as the first embodiment is omitted.

In step S301, the radio communication terminal 1 receives a PDU from the radio base station 2.

In step S302, the radio communication terminal 1 determines whether or not the PDU received in step S301 is the final PDU. When the PDU received in step S301 is the final PDU, the radio communication terminal 1 transmits an ACK to the radio base station 2, and terminates the receiving operation. On the other hand, when the PDU received in step S301 is not the final PDU, the operation moves to the processing in step S303.

In step S303, the radio communication terminal 1 determines whether or not another PDU is received from the radio base station 2. When the PDU is received from the radio base station 2, the operation moves to the processing in step S304. On the other hand, when the PDU is not received from the radio base station 2, the operation moves to the processing in step S305.

In step S304, the radio communication terminal 1 determines whether or not the PDU received in step S303 is the final PDU. When the PDU received in step S303 is the final PDU, the radio communication terminal 1 transmits an ACK to the radio base station 2, and terminates the receiving operation. On the other hand, when the PDU received in step S301 is not the final PDU, the operation returns to the processing in step S303.

In step S305, the radio communication terminal 1 determines whether or not the fixed time period (for example, 2 TTIs) has passed since the receipt of the last PDU. When the fixed time period has passed since the receipt of the last PDU, the operation moves to the processing in step S306. When the fixed time period has not passed since the receipt of the last PDU, the operation returns to the processing in step S303.

In step S306, the radio communication terminal 1 estimates the PDU retransmission timing of the radio base station 2 by use of the equation (1), and determines the target SIR update time.

In step S307, the radio communication terminal 1 increases the target SIR by the fixed value (for example, 1 dB) at the target SIR update time determined in step S306. Thereafter, the operation returns to the processing in step S303.

(2) Operation Sequence of Mobile Communication System:

FIG. 10 is a sequence diagram showing an operation sequence of the mobile communication system according to this embodiment.

In steps S401 to S403, the radio base station 2 sequentially transmits the PDUs of the sequence numbers "1" to "3" to the radio communication terminal 1 at TTIs. The radio communication terminal 1 sequentially receives the PDUs transmitted by the radio base station 2, and memorizes the sequence numbers "1" to "3."

In step S404, the radio base station 2 transmits the PDU of the sequence number "4" to the radio communication terminal 1. In the PDU of sequence number "4," the polling bit is set to "1" (ON). However, here, assume that the PDU of the sequence number "4" is missing in the radio communication section due to a change in the radio communication environment, and accordingly is not received by the radio communication terminal 1. The radio base station 2 starts measuring the polling time at a timing of transmitting the PDU of the sequence number "4" to the radio communication terminal 1.

In step S405, the radio communication terminal 1 detects a loss of the final PDU on the basis of a fact that the fixed time period (2 TTIs) has passed without receipt of the polling bit.

In step S406, the radio communication terminal 1 estimates the retransmission timing of the PDU (SN: 4) of the radio base station 2 by use of the equation (1), and determines the target SIR update time. Here, the PDU lastly received is the PDU (SN: 3), and the target SIR update time is determined on the basis of the receiving time t1 of the PDU (SN: 3).

In step S407, the radio communication terminal 1 increases the target SIR by the fixed value (for example, 1 dB) at the target SIR update time determined in step S406. By increasing the target SIR by the fixed value, the TPC command periodically transmitted from the radio communication terminal 1 to the radio base station 2 is set to be the "UP" command.

In step S408, in response to receipt of the "UP" command, the radio base station 2 increase, by the fixed value (for example, 1 dB), the transmission power of the communication channel with the radio communication terminal 1.

In step S409, the radio base station 2 detects that the polling time expires (times out), and retransmits to the radio communication terminal 1 the PDU of the sequence number "4" having been transmitted in step S404. In the PDU of the sequence number "4," the polling bit is set to "1" (ON). Since the transmission power of the communication channel with the radio communication terminal 1 is increased in step S408, the radio communication terminal 1 stably receives the PDU retransmitted by the radio base station 2.

In step S410, the radio communication terminal 1 transmits an ACK to the radio base station 2 since the polling bit of the PDU received in step S409 is set to "1" (ON).

As described above, the radio communication terminal 1 according to this embodiment determines that the final PDU is lost when no PDU is received for the fixed time period before the final PDU is received. When it is determined that the final PDU is lost, the radio communication terminal 1 estimates the retransmission timing of the radio base station 2 on the basis of the receiving time of the last PDU before the final PDU, the polling time and the TTI.

In this way, the radio communication terminal 1 is capable of detecting even a PDU loss that cannot be detected from the sequence numbers. Moreover, the radio communication terminal 1 is capable of causing the radio base station 2 to increase its transmission power at an appropriate timing by instructing to increase the transmission power at a timing suited to the retransmission timing of the radio base station 2.

[Other Embodiments]

Although the present invention has been described above by use of the embodiments, it should not be understood that the description and the drawings that are part of this disclosure limit the present invention. From this disclosure, various alternative embodiments, examples and applied techniques are obvious to those skilled in the art.

The foregoing embodiments have been described by using, as an example, the case where the radio base station 2 is a PDU transmitting side while the radio communication terminal 1 is a PDU receiving side. However, it does not matter that the radio communication terminal 1 is the PDU transmitting side while the radio base station 2 is the PDU receiving side.

Moreover, in the foregoing embodiments, the target BLER value is not changed while the target SIR is increased. For this reason, the target SIR automatically returns to the condition before the increase of the target SIR. However, the BLER value is measured at long intervals, the target SIR cannot return to the original condition immediately. Accordingly, the target SIR may be controlled so that the target SIR can be decreased at a timing when the fixed time period times out after the increase of the target SIR. In this case, the target SIR can return to the original condition immediately.

In addition, although the foregoing embodiments have been described for the mobile communication system employing the W-CDMA scheme, the present invention may be applied not only to the W-CDMA scheme but also to other communication schemes in which the closed loop transmission power control is performed.

Hence, it should be understood that the present invention includes various embodiments and the like, which are not described here. Accordingly, the present invention is limited only by the matters to define the invention in the scope of claims appropriate based on this disclosure.

What is claimed is:

1. A communication device comprising:
   a receiver that continuously receives a plurality of data pieces from a transmitter via a radio link signal;
   an instruction transmitter that periodically, at a first predetermined time interval that is shorter than a second time interval at which the transmitter transmits the plurality of data pieces, transmits, to the transmitter, an instruction controlling a transmission power of the radio link signal based on a comparison between a target receiving quality of the radio link signal and a measured receiving quality of the radio link signal;
   a setting unit that sets the target receiving quality of the radio link signal;
   a determining unit that determines whether any one of the plurality of data pieces is lost;
   a retransmission request unit that transmits a retransmission request to the transmitter requesting retransmission of a lost piece of the plurality of data pieces data when, or immediately after, loss of the lost piece of the plurality of data pieces is determined, wherein
   the instruction transmitter transmits an instruction instructing the transmitter to increase the transmission power of the radio link signal when the measured receiving quality is lower than the target receiving quality,
   the setting unit increases the target receiving quality by a predetermined value after sending the retransmission request, when transmitting the retransmission request, or immediately after loss of the lost piece of the plurality of data pieces is determined, and
   the setting unit decreases the target receiving quality by the predetermined value after a lapse of a predetermined time period from increasing the target receiving quality when, or immediately after, loss of the lost piece of the plurality of data pieces is determined.

2. The communication device according to claim 1, wherein the determining unit determines whether any one of the plurality of data pieces is lost according to whether sequence numbers respectively included in the plurality of data pieces are continuous.

3. The communication device according to claim 1, wherein the determining unit determines whether a final data piece of the plurality of data pieces is lost when one of the plurality of data pieces including data indicating that it is the last data piece of the plurality of data pieces is not received for a fixed time period.

4. A communication device for continuously receiving a plurality of data pieces from a transmitter via a radio link, comprising:
   a determining unit that determines whether any one of the plurality of data pieces is lost; and
   an instruction transmitter that transmits, to the transmitter, an instruction to improve transmission quality of the transmitter, in a case where the determining unit determines that any one of the plurality of data pieces is lost, wherein
   the instruction transmitter transmits the instruction before a retransmission timing when the transmitter retransmits a lost piece of the plurality of data pieces,
   the determining unit determines whether a final data piece of the plurality of data pieces is lost when one of the plurality of data pieces including data indicating that it is the last data piece of the plurality of data pieces is not received for a fixed time period,
   the final data piece is retransmitted by the transmitter when the transmitter does not receive an acknowledgement corresponding to the final data piece from the communication device for a predetermined time period, and
   when the determining unit determines that the final data piece is lost, the instruction transmitter estimates a retransmission timing based on a receiving time of a last data piece before the final data piece, the predetermined time period, and a time interval at which the transmitter transmits the plurality of data pieces.

5. A radio communication terminal comprising the communication device according to any one of claims 1 and 2-4.

6. A radio base station comprising the communication device according to any one of claims 1 and 2-4.

7. A communication method for continuously receiving a plurality of data pieces from a transmitter via a radio link, comprising the steps of:
   determining whether any one of the plurality of data pieces is lost; and
   transmitting, to the transmitter periodically at a first predetermined time interval that is shorter than a second predetermined time interval at which the transmitter transmits the plurality of data pieces, an instruction controlling a transmission power of the radio link signal based on a comparison between a target receiving quality of the radio link signal and a measured receiving quality of the radio link signal;
   determining whether any one of the plurality of data pieces is lost;
   transmitting a retransmission request to the transmitter requesting retransmission of a lost piece of the plurality of data pieces data when, or immediately after, loss of the lost piece of the plurality of data pieces is determined;
   transmitting an instruction instructing the transmitter to increase the transmission power of the radio link signal when the measured receiving quality is lower than the target receiving quality;
   increasing the target receiving quality by a predetermined value after sending the retransmission request, when transmitting the retransmission request or immediately after loss of the lost piece of the plurality of data pieces is determined; and
   decreasing the target receiving quality by the predetermined value after a lapse of a predetermined time period from increasing the target receiving quality when, or immediately after, loss of the lost piece of the plurality of data pieces is determined.

* * * * *